(12) United States Patent
Lei (10) Patent No.: US 7,002,741 B2
(45) Date of Patent: Feb. 21, 2006

(54) IMAGE TRANSMISSION SYSTEM FOR ENDOSCOPES AND METHOD OF PRODUCING A ROD LENS

(75) Inventor: Fang Lei, Durchhausen (DE)

(73) Assignee: KarlStorz GmbH & Co. KG, (DE)

( * ) Notice: Subject to any disclaimer, the term of this patent is extended or adjusted under 35 U.S.C. 154(b) by 532 days.

(21) Appl. No.: 09/949,608

(22) Filed: Sep. 10, 2001

(65) Prior Publication Data
US 2002/0057501 A1    May 16, 2002

Related U.S. Application Data

(63) Continuation of application No. PCT/EP00/01980, filed on Mar. 7, 2000.

(30) Foreign Application Priority Data
Mar. 8, 1999  (DE) ................. 199 10 050

(51) Int. Cl.
  *G02B 23/00*    (2006.01)
(52) U.S. Cl. ............... 359/435; 359/434; 359/362
(58) Field of Classification Search ........ 359/362–363, 359/434–435, 642–690, 745–795; 600/160–176, 600/101, 138
See application file for complete search history.

(56) References Cited

U.S. PATENT DOCUMENTS

| 1,443,150 | A | * | 1/1923 | Fridolin ............... 451/349 |
| 4,025,155 | A | * | 5/1977 | Imai ................. 359/435 |
| 4,168,882 | A | * | 9/1979 | Hopkins ............. 359/434 |
| 4,354,730 | A | * | 10/1982 | Bel ................. 359/434 |
| 4,784,118 | A | * | 11/1988 | Fantone et al. ....... 600/160 |
| 4,961,802 | A | * | 10/1990 | Otsuki et al. ........ 156/153 |
| 5,059,009 | A | * | 10/1991 | McKinley ........... 359/435 |
| 5,097,359 | A | * | 3/1992 | McKinley ........... 359/435 |
| 5,097,759 | A | * | 3/1992 | Vilgrain et al. ....... 99/483 |
| 5,142,410 | A | * | 8/1992 | Ono et al. .......... 359/435 |
| 5,206,759 | A | * | 4/1993 | Ono et al. .......... 359/434 |
| 5,233,473 | A | * | 8/1993 | Kanamori .......... 359/708 |
| 5,416,638 | A | * | 5/1995 | Broome ............. 359/656 |
| 5,684,629 | A | * | 11/1997 | Leiner .............. 359/435 |
| 5,805,345 | A | * | 9/1998 | Nagaoka ............ 359/654 |
| 6,327,096 | B1 | * | 12/2001 | Tsuchida ........... 359/654 |

FOREIGN PATENT DOCUMENTS

| DE | 28 37 119 | * | 3/1979 |
| EP | 310 640 B1 | * | 3/1988 |
| EP | 452 053 A1 | * | 10/1991 |
| GB | 954 629 | * | 7/1964 |
| GB | 1 443 150 | * | 7/1976 |
| GB | 2 081 923 | * | 2/1982 |

* cited by examiner

*Primary Examiner*—Thong Q Nguyen
(74) *Attorney, Agent, or Firm*—St. Onge Steward Johnston & Reens LLC (57) ABSTRACT

The invention relates to an image transmission system for endoscopes and similar viewing tubes with at least one rod lens and at least one additional lens system. In order to produce an image transmission system of simple and economical construction, it is proposed in accordance with the invention that the minimum of one rod lens should be constructed as a plano-convex lens whose length corresponds to the curvature radius of its convex terminal surface. In addition, the invention relates to a process for producing a rod lens for an image transmission system as well as an endoscope equipped with such an image transmission system.

26 Claims, 3 Drawing Sheets

IMAGE TRANSMISSION SYSTEM FOR ENDOSCOPES AND METHOD OF PRODUCING A ROD LENS

The present application is a continuation of pending International Patent Application PCT/EP00/01980 filed on Mar. 7, 2000, which designates the United States, and which claims priority of German patent application 199 10 050.0 filed on Mar. 8, 1999.

FIELD OF THE INVENTION

The invention relates to an image transmission system for endoscopes and similar viewing tubes with at least one rod lens and with at least one additional lens system. In addition the invention relates to a process for producing a rod lens for an image transmission system as well as an endoscope equipped with a similar image transmission system.

BACKGROUND OF THE INVENTION

Image transmission systems of this kind, also known as relay lens systems, are used in particular for endoscopes but also for other viewing tubes such as technoscopes, cystoscopes, periscopes, and the like. Endoscopes consist of an eyepiece part, which contains the eyepiece, as well as an elongated shaft in which additional optical components are positioned. These other optical components consist of the lens mounted on the front (distal) end of the endoscope and image transmission or relay lens systems. The lens receives the scene to be observed and produces an interim image in an initial inter-image plane. This interim image is again pictured by an image transmission or relay lens system and carried to the next inter-image plane, from where an additional image transmission or relay lens system assumes the task of forwarding to the next inter-image plane, until the image reaches the eyepiece.

The use of rod lenses to form image transmission systems was first proposed by Professor Hopkins in GB-PS 954 629. According to this theoretical proposal by Professor Hopkins, every image transmission system consists of two biconvex rod-shaped lenses and at least two additional meniscus lenses. The combination of rod-shaped biconvex lenses with meniscus lenses permits, first of all, the achievement of great image brightness, and second, a sufficiently good compensation for image errors such as astigmatisms and image field curvature that disturb image transmission systems.

On the basis of Professor Hopkins's efforts, a number of modified image transmission systems were developed and described, in which rod-shaped lens elements were also used.

An additional image transmission system of this type is familiar, for instance, from EP-B1-0 310 640. In this well-known refined image transmission system the rod lenses consist of convex/concave lenses, whose concave surfaces are turned toward the center plane and which are each cemented together with one additional lens system. The additional lens systems are biconvex single lenses, where the concave surfaces of the rod lenses are each cemented together with one of the convex surfaces of the other lens systems. Although this familiar image transmission system permits a good correction of the astigmatism and image field curvature, conventional rod lenses have the disadvantage that they generally have two spherical terminal surfaces, which are manufactured individually and are also cemented to at least one additional lens. This requires a complex, costly production process.

An additional image transmission system is known from EP 0452 053 A1. In this familiar lens system, each relay lens system consists of two identically built lens systems with one middle biconvex lens and two convex/concave lenses cemented together with this middle lens. The biconvex middle lens in this familiar lens system can be produced from a glass sphere out of which a cylindrical rod with two convex terminal surfaces is produced through appropriate processes such as for instance polishing. Because of the many spherical cementing surfaces between the middle lenses and the convex/concave lenses connected with them, this familiar lens system too can only be produced at considerable expense, since the surfaces to be joined together must be processed with great accuracy.

The problem of the many spherical cement surfaces also arises with the image transmission system known from FIG. 8 of U.S. Pat. No. 5,095,359, in which with two biconvex lenses are connected by way of a biconcave middle lens and both biconvex lenses at their ends are connected with a convex/concave lens.

On the basis of this technological status, the invention is based on the task of producing an image transmission system of the kind mentioned at the outset, which can be produced with the simplest possible rod lenses and which ensures a good correction of the image field curvature. In terms of the process, the invention is based on the task of developing an economically feasible process for producing a rod lens for an image transmission system.

The product solution of this task, in accordance with the invention, is characterized in that at least one rod lens is formed as a plano-convex lens, whose length corresponds to the curvature radius of its convex terminal surface.

This formation of the rod as plano-convex lenses in accordance with the invention permits a simple construction of the image transmission system. Rod lenses formed in this manner can be produced, for instance, at reasonable cost from one-piece biconvex lenses whose length is twice as great as the curvature radius of the two convex terminal surfaces, which are severed in order to produce two plano-convex rod lenses along the center plane.

In accordance with a practical demonstration of the invention, the plane terminal surface of at least one plano-convex rod lens forms the beginning and/or end of the respective image transmission system.

In accordance with a preferred demonstration of the invention, the rod lenses of two sequentially arranged image transmission systems are cemented together at their plane terminal surfaces. Through this direct joining of two rod lenses, it is possible to eliminate an additional glass-air surface from the image transmission system.

A considerable cost advantage and a clear simplification of the production process can be achieved, according to the invention, because two sequentially arranged rod lenses are formed as one-piece biconvex rod lenses, whose length is twice as large as the curvature radius of the two convex terminal surfaces, where one half of the biconvex rod lens is subordinated to the directly adjoining image transmission system. This type of formation of two rod lenses as one-piece biconvex lens is possibly without any substantive changes to the image transmission system because the plane terminal surfaces of the rod lenses produce no optically relevant effect and can be given up for the sake of a simply and economically produced one-piece biconvex rod lens. In comparison with conventional image transmission systems, this system is also very well adapted to the correction of image field curvature, especially in the tangential direction.

In addition, it is proposed with this invention, that the minimum of one additional lens system should be positioned symmetrically between two rod lenses with their convex terminal surfaces turned toward one another.

The minimum of one additional lens system, in accordance with the invention, consists of at least three lenses, whereby this lens system for best advantage should be constructed symmetrically and the refractive power of the two outer lenses has the opposite mathematical sign to that of the minimum of one middle lens.

In accordance with an initial demonstration of the invention, the additional lens system is formed as a threesome consisting of three lenses cemented together. Through this design of the additional lens system as a threesome consisting of three lenses cemented together in accordance with the invention, the number of glass-air surfaces of the image transmission system is further reduced.

In accordance with a second demonstration of the image transmission system of this invention, it is proposed that the additional lens system should be formed as two pairs, each consisting of two lenses cemented together. In this manner, an air space can be ensured between the two pairs. As an alternative variant to the formation of the minimum of one additional lens system as a threesome, the use of the two pairs has two additional glass-air surfaces and thus a loss of reflectivity of light energy, but this formation of the image transmission system using the rod lens, as proposed by the invention, is cost effective and simple to produce and permits a very good correction of image field curvature.

The shape of the middle lens (in the threesome) or of the middle lenses (in the pairs) depends on the type of glass chosen. In accordance with an initial practical demonstration, under the condition that $n_m < n_a$ the outer lenses of the additional lens system are formed as convex/concave meniscus lenses and the one (threesome) or two (pairs) middle lens(es) are formed as biconvex lenses, where $n_m$ is the refractive index of the middle lens(es) and $n_a$ is the refractive index of the outer lenses.

Under the condition that $n_m > n_a$

In accordance with a second practical demonstration, the outer lenses of the additional lens system are formed as biconvex lenses and of the (threesome) or two (pairs) middle lens(es) are formed as biconcave lens(es), where $n_m$ is the refractive index of the middle lens(es) and $n_a$ the refractive index of the outer lenses.

In accordance with a particularly advantageous demonstration of the additional lens system formed as a threesome, the middle lens of the additional lens system is formed as biconvex lenses, whose length is twice as great as the curvature radius of its two terminal surfaces. Just as with the formation of the rod lenses as one-piece biconvex lenses, the formation of the middle lens of the threesome as a biconvex lens is particularly cost effective.

SUMMARY OF THE INVENTION

In order to overcome the deficiencies of the prior art and to achieve at least some of the objects and advantages listed, the invention comprises an image transmission system for endoscopes and similar viewing tubes with two rod lenses and at least one additional lens system, where the two rod lenses are designed as plano-convex lenses, each of whose lengths is as great as the curvature radius of their convex terminal surfaces, the plane end surfaces of at least one of the plano-convex rod lenses forming at least one of the start and the end of the image transmission system, the two rod lenses being arranged such that the convex end surfaces thereof face one another, and the at least one additional lens system being arranged between the two rod lenses.

Because of the cementing of the middle biconvex lens of the threesome with the two identical outer lenses, the threesome forms almost an additional rod lens whose diaphragm plane lies in the center plane of the middle lens, formed as a biconvex lens, of the additional lens system.

Finally, it is proposed with this invention that because of the formation of the two rod lenses as biconvex lenses, the interim images should lie in the center planes of the rod lenses formed as one-piece biconvex lenses.

The solution of the task by the invention's process is characterized by these processing steps:

a. production of a glass sphere, whose radius corresponds to the curvature radius of the convex terminal surface of the rod lens, and b. formation of a biconvex cylindrical glass rod from the glass sphere.

The production of a glass sphere, in comparison to the production of long rod lenses with a small diameter, represents a relatively simple procedure.

The biconvex cylindrical glass rod formed in process step (b) corresponds to two sequentially arranged plano-convex rod lenses in accordance with this invention. For the formation of a single rod lens that is, a half-biconvex lens, process step (b) is supplemented with an additional process step in which the cylindrical glass rod is severed along its center plane.

The formation of the biconvex cylindrical glass rod in process step (b), in accordance with an initial demonstration of the process under this invention, consists of the removal from the glass sphere of a core whose axis essentially runs through the center point of the glass sphere.

In accordance with an alternative process, the biconvex glass rod can be formed through polishing of the glass sphere.

This process, in accordance with the invention, for producing rod lenses offers the greatest advantages in the production of rod lenses of small length.

BRIEF DESCRIPTION OF THE DRAWINGS

Additional characteristics and advantages of the invention can be seen from the following description of the related illustrations, in which four models of an image transmission system according to this invention are depicted schematically. The illustrations are as follows.

DETAILED DESCRIPTION OF THE DRAWINGS

In the following description of the illustrations, we designate as spherical lenses the biconvex lenses whose length is twice as large as the curvature radius of the two convex terminal surfaces.

Figure 1:
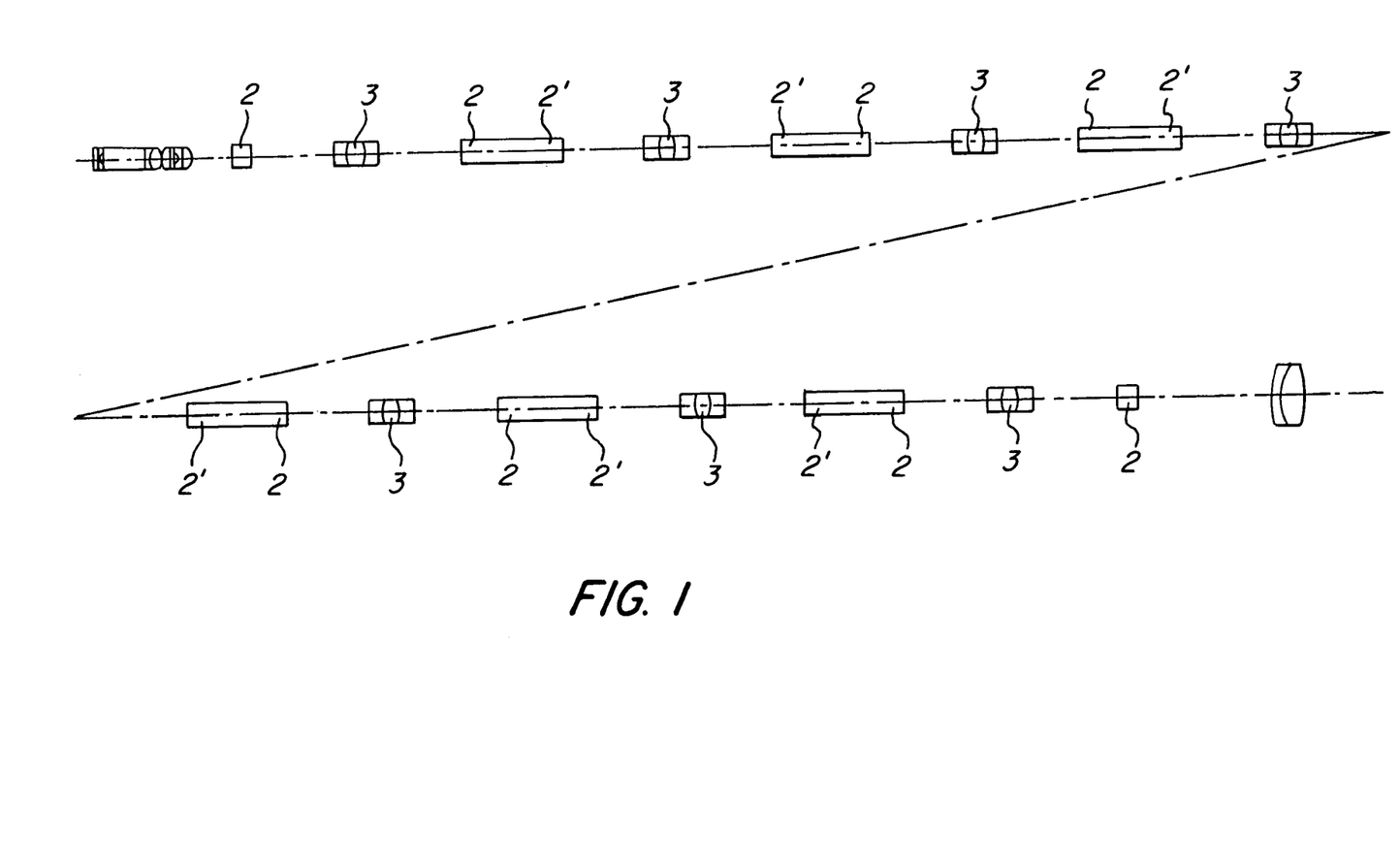
FIG. 1 An exemplary schematic longitudinal section through the arrangement of the lenses in an endoscope.

FIG. 1 shows schematically the complete arrangement of the lenses in an endoscope. The illustrated optical system consists altogether of seven image transmission systems, each extending from one inter-image plane to the next. Because the inter-image planes lie in the center plane 1 of the rod lenses 2, every image transmission system in turn has two "half" rod lenses 2 and each has an additional lens system 3.

Figure 2:
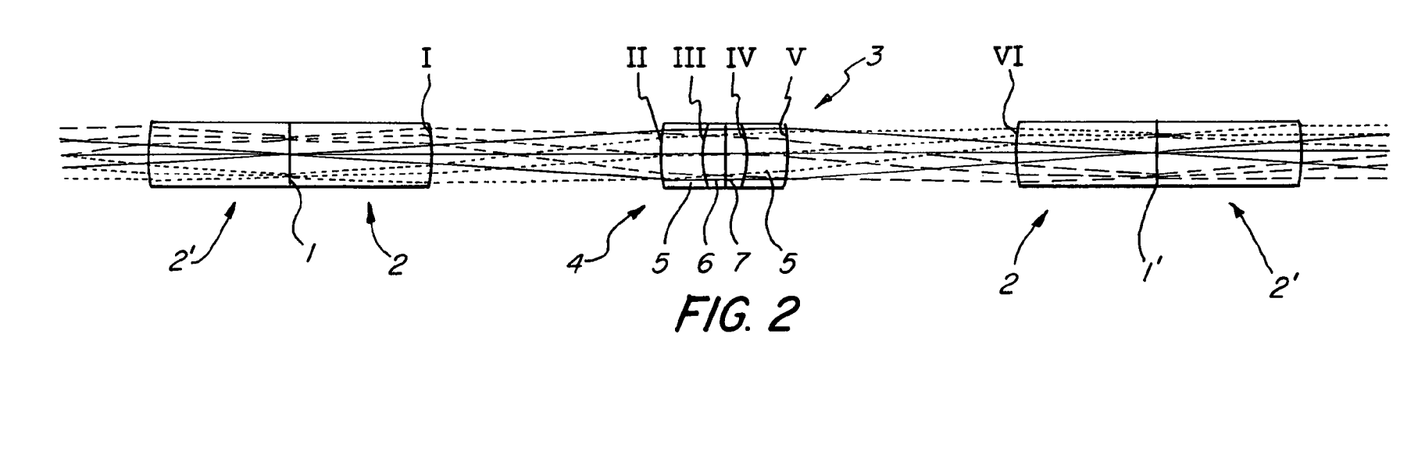
FIG. 2 A schematic longitudinal section through an initial model of an image transmission system according to the invention, in which the additional lens system is formed as a threesome with a biconvex middle lens and convex/concave outer lenses.

The image transmission system shown in FIG. 2 consists of two plano-convex rod lenses 2 shaped as spherical lenses and one additional lens system 3 formed as a threesome 4 and arranged symmetrically between the two rod lenses. Because each image transmission system consists of two plano-convex rod lenses 2 in the model of FIG. 2, in which two rod lenses 2 of two sequentially arranged image transmission systems are joined to form one common spherical lens, the reference numbers referring to a second system are accompanied with an "prime" sign (').

In the formation of the rod lenses 2 as plano-convex lenses, the following possibilities for arranging and forming the rod lenses are available for setting up the illustrated image transmission systems:

The image transmission system has only one plano-convex rod lens 2, whereby the plane terminal surface forms the beginning or the end of the image transmission system.

The image transmission system has two plano-convex rod lenses 2 whose plane ends forms the beginning and end of the image transmission system.

The plano-convex rod lenses 2 of two directly sequential image transmission systems are cemented together at their plane terminal surfaces.

The rod lenses 2 of two directly sequentially arranged image transmission systems are formed as one-piece biconvex rod lenses.

As can be seen from FIG. 1, the first and last rod lenses 2 can be formed in abbreviated form in an endoscope in order to avoid having an inter-image surface coincide directly with the plane terminal surface of this rod lens 2, because soiling of this surface and/or various damage could be a direct consequence.

The spherical lenses that form the rod lenses 2 are distinguished in that they have the same curvature radius at both terminal surfaces and the length of each rod lens 2 is essentially equal to the doubled curvature radius of the terminal surfaces of the rod lenses 2.

In the first example, illustrated in FIG. 2, the threesome 4 of the additional lens system 3 consists of two identical outer lenses 5, which are formed as concave/convex meniscus lenses. The middle lens 6, positioned between the two outer lenses 5 and cemented to them, is formed as a biconvex lens.

In addition, FIG. 2 shows the path of the beam. As can be seen from this path, with the use of spherical lenses as rod lenses 2, the interim images are situated in the center plane of the spherical lenses. This diaphragm plane of the image transmission system is situated in the center plane 7 of the middle lens 6.

Figure 3:
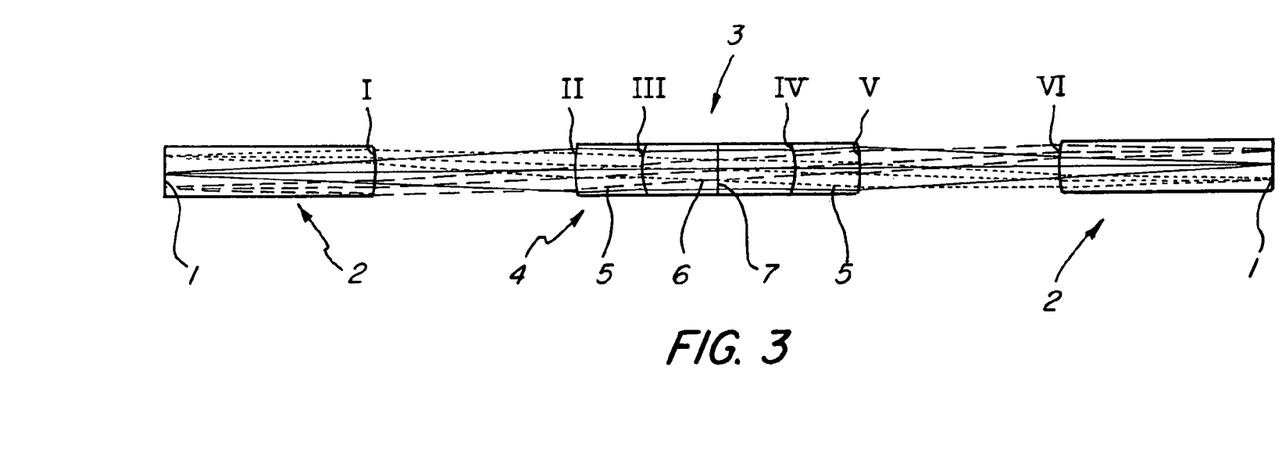
FIG. 3 An image transmission system in accordance with a second model, in which the middle lens of the threesome is formed as a spherical lens.

FIG. 3 shows a particularly advantageous demonstration of the model in accordance with FIG. 2, with a biconvex middle lens 6 for the threesome 4. In this model the middle lens 6 as well as the two rod lenses 2 are formed as spherical lenses whose terminal surfaces both have the same curvature radius and whose length is twice as great as the curvature radius of their two terminal surfaces. The diaphragm plane of the image transmission system is situated in the center plane 7 of the middle lens 6 formed as a spherical lens.

Figure 4:
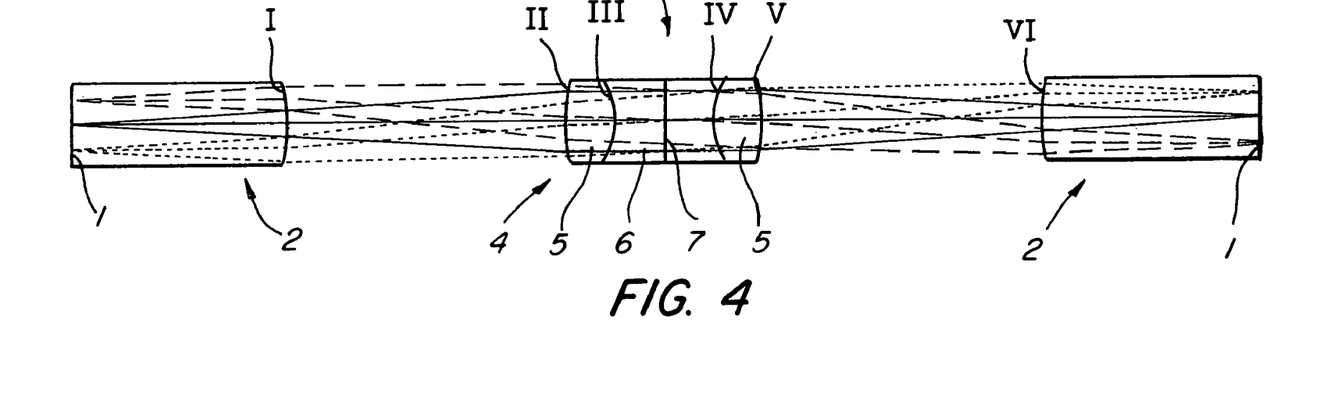
FIG. 4 A third model of an image transmission system in accordance with the invention, in which the middle lens of the threesome is formed as a biconcave lens and the outer lenses as biconvex lenses.
Figure 5:
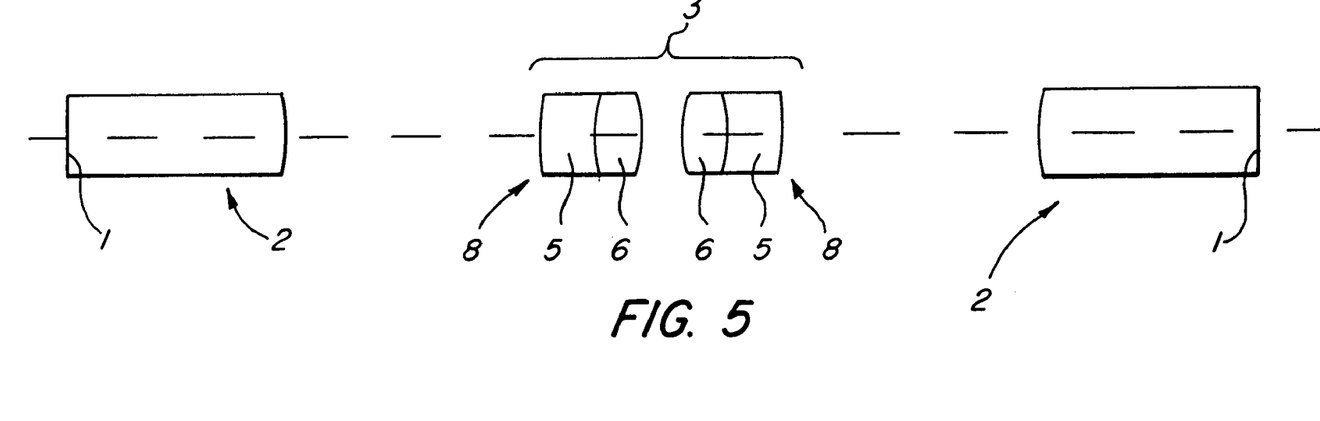
FIG. 5 A schematic longitudinal section through a fourth model of an image transmission system in accordance with the invention, in which the additional lens system consists of two pairs whose middle lens is biconvex and whose outer lenses are concave/convex.

In the model of FIG. 3, as well as those in FIGS. 4 and 5, in order to present a clear overview, the two rod lenses formed as spherical lenses are only shown halfway; that is, these illustrations each depict a complete image transmission system.

In accordance with a second practical demonstration, the outer lenses of the additional lens system are formed as biconvex lenses and of the (threesome) or two (pairs) middle lens(es) are formed as biconcave lens(es), where $n_m$ is the refractive index of the middle lens(es) and $n_a$ the refractive index of the outer lenses.

The fourth model of an image transmission system, shown in FIG. 5, is distinguished from those of FIGS. 2 through 4 in that the additional lens system 3 arranged symmetrically between the two rod lenses 2 is not formed as a threesome 4, but rather consists of two pairs 8 arranged at a distance from one another. In the illustrated model, the outer lenses 5 consist of convex/concave meniscus lenses, while the middle lenses 6 are formed as biconvex or plano-convex lenses. Here too, of course, depending on the refractive index $n_m$ of the middle lenses 6 in relation to the refractive index $n_a$ of the outer lenses 5, it is possible to form the outer lenses 5 as biconvex or plano-convex lenses, while the inner lenses 6 are formed as biconcave, plano-concave, plano-convex, or convex/concave lenses.

Two concrete examples are presented below for each of the models shown in FIGS. 2 through 4. The examples in Tables 1 and 2 refer to a model in accordance with FIG. 2, the examples in Tables 3 and 4 to a model in accordance with FIG. 3, and the examples in Tables 5 and 6 to the model in accordance with FIG. 4. The optically effective surfaces indicated in the tables are labeled in FIGS. 2 through 4 with Roman numerals I through IV. The values for the Abbé counts are rounded off in the tables to one decimal place. The precise numerical values along with variations of these indicated values can be easily obtained by using customary optic design programs.

TABLE 1

| Surface | Radius | Thickness | Refractive Index | Abbé Number |
|---|---|---|---|---|
| 1 | (plane) | | | |
| | | 4.664 | 1.52 | 64.1 |
| I | −4.664 | | | |
| | | 7.5 | Air | — |
| II | 5.158 | | | |
| | | 1.4 | 1.85 | 32.2 |
| III | 2.585 | | | |
| | | 1.44 | 1.62 | 53.1 |
| IV | −2.585 | | | |
| | | 1.4 | 1.85 | 32.2 |
| V | −5.158 | | | |
| | | 7.5 | Air | — |
| VI | 4.664 | | | |
| | | 4.664 | 1.52 | 64.1 |
| 1' | (plane) | | | |

TABLE 2

| Surface | Radius | Thickness | Refractive Index | Abbé Number |
|---|---|---|---|---|
| 1 | (plane) | | | |
| | | 4.664 | 1.52 | 64.1 |
| I | −4.664 | | | |
| | | 7.36 | Air | — |
| II | 6.467 | | | |
| | | 1.33 | 1.85 | 32.2 |

TABLE 2-continued

| Surface | Radius | Thickness | Refractive Index | Abbé Number |
|---|---|---|---|---|
| III | 2.661 | | | |
| | | 2.16 | 1.72 | 47.9 |
| IV | −2.661 | | | |
| | | 1.33 | 1.85 | 32.2 |
| V | −6.467 | | | |
| | | 7.36 | Air | — |
| VI | 4.664 | | | |
| | | 4.664 | 1.52 | 64.1 |
| 1' | (plane) | | | |

TABLE 3

| Surface | Radius | Thickness | Refractive Index | Abbé Number |
|---|---|---|---|---|
| 1 | (plane) | | | |
| | | 8.785 | 1.62 | 36.4 |
| I | −8.785 | | | |
| | | 8.36 | Air | — |
| II | 6.300 | | | |
| | | 2.77 | 1.85 | 32.2 |
| III | 3.208 | | | |
| | | 6.416 | 1.57 | 57.5 |
| IV | −3.208 | | | |
| | | 2.77 | 1.85 | 32.2 |
| V | −6.300 | | | |
| | | 8.36 | Air | — |
| VI | 8.785 | | | |
| | | 8.785 | 1.62 | 36.4 |
| 1' | (plane) | | | |

TABLE 4

| Surface | Radius | Thickness | Refractive Index | Abbé Number |
|---|---|---|---|---|
| 1 | (plane) | | | |
| | | 7.286 | 1.52 | 64.1 |
| I | −7.286 | | | |
| | | 9.88 | Air | — |
| II | 11.800 | | | |
| | | 3.0 | 1.85 | 32.2 |
| III | 2.943 | | | |
| | | 5.886 | 1.81 | 40.6 |
| IV | −2.943 | | | |
| | | 3.0 | 1.85 | 32.2 |
| V | −11.800 | | | |
| | | 9.88 | Air | — |
| VI | 7.286 | | | |
| | | 7.286 | 1.52 | 64.1 |
| 1' | (plane) | | | |

TABLE 5

| Surface | Radius | Thickness | Refractive Index | Abbé Number |
|---|---|---|---|---|
| 1 | (plane) | | | |
| | | 5.309 | 1.62 | 36.4 |
| I | −5.309 | | | |
| | | 6.89 | Air | — |
| II | 6.923 | | | |
| | | 1.2 | 1.64 | 60.1 |
| III | −1.693 | | | |
| | | 2.4 | 1.66 | 50.9 |
| IV | 1.693 | | | |
| | | 1.2 | 1.64 | 50.1 |
| V | −6.923 | | | |
| | | 6.89 | Air | — |

TABLE 5-continued

| Surface | Radius | Thickness | Refractive Index | Abbé Number |
|---|---|---|---|---|
| VI | 5.309 | | | |
| | | 5.309 | 1.62 | 36.4 |
| 1' | (plane) | | | |

TABLE 6

| Surface | Radius | Thickness | Refractive Index | Abbé Number |
|---|---|---|---|---|
| 1 | (plane) | | | |
| | | 5.085 | 1.62 | 36.4 |
| I | −5.085 | | | |
| | | 6.71 | Air | — |
| II | 6.043 | | | |
| | | 1.00 | 1.72 | 50.4 |
| III | −2.512 | | | |
| | | 2.4 | 1.81 | 40.6 |
| IV | 2.512 | | | |
| | | 1.00 | 1.72 | 50.4 |
| V | −6.043 | | | |
| | | 6.71 | Air | — |
| VI | 5.085 | | | |
| | | 5.085 | 1.62 | 36.4 |
| 1' | (plane) | | | |

The schematically illustrated image transmission systems are distinguished in that the use of spherical lenses as rod lenses 2 makes them simple and economical to produce, and thus an especially good correction of the image field curvature is achieved.

As a supplement to the examples illustrated and described here, it should be mentioned that it is of course possible at any time to incorporate in the image transmission system optically ineffective surfaces, particularly plane surfaces, without going beyond the confines of the invention. Thus, for instance, the individual lenses can be constructed from several parts. In familiar manner, using commercially available optic design programs, the data of any other lenses employed can be adapted as necessary for the use of multi-part lenses and/or for the arrangement of an air space between two lenses.

What is claimed is:

1. Image transmission system for endoscopes and similar viewing tubes with two rod lenses and at least one additional lens system, characterized in that the two rod lenses are designed as plano-convex lenses, each of whose lengths is approximately equal to the curvature radius of their convex terminal surfaces, the plane end surfaces of at least one of the plano-convex rod lenses forming at least one of the start and the end of the image transmission system, the two rod lenses being arranged such that the convex end surfaces thereof face one another, and the at least one additional lens system being arranged between the two rod lenses.

2. Image transmission system according to claim 1, characterized in that both rod lenses have the same length and are arranged with their convex end surfaces turned toward one another and that at least one additional lens system is arranged symmetrically to the center plane between the two rod lenses.

3. Image transmission system according to claim 2, characterized in that the additional lens system consists of at least three lenses.

4. Image transmission system according to claim 3, characterized in that additional lens system is designed symmetrically to the center plane, whereby the refractive power of both outer lenses of the additional lens system has the contrary sign to that of the one or more middle lenses.

5. Image transmission system according to claim 3, characterized in that $n_m < n_a$ and the outer lenses of the additional lens system are designed as convex/concave meniscus lenses and the one (triplet 4) or two (pair 8) outer lens(es) are designed as biconvex or plano-convex lens(es), where $n_m$ is the refractive index of the middle lens(es) and
$n_a$ is the refractive index of the outer lenses.

6. Image transmission system according to claim 3, characterized in that $n_m > n_a$ and the outer lenses of the additional lens system are designed as biconvex or plano-convex lenses and the one (triplet 4) or two (pairs 8) middle lens(es) are designed as biconcave, plano-concave, plano-convex, or convex/concave lens(es), where $n_m$ is the refractive index of the middle lens(es) and
$n_a$ is the refractive index of the outer lenses.

7. Image transmission system according to claim 1, characterized in that the additional lens system is designed as a threesome consisting of three lenses cemented to one another.

8. Image transmission system according to claim 7, characterized in that the middle lens of the additional lens system is designed as a biconvex lens, whose length is twice as large as the curvature radius of their two end surfaces.

9. Image transmission system according to claim 8, characterized by the following data:

| Surface | Radius | Thickness | Refractive Index | Abbé Number |
|---|---|---|---|---|
| 1 | (plane) | | | |
| | | 8.785 | 1.62 | 36.4 |
| I | −8.785 | | | |
| | | 8.36 | Air | — |
| II | 6.300 | | | |
| | | 2.77 | 1.85 | 32.2 |
| III | 3.208 | | | |
| | | 6.416 | 1.57 | 57.5 |
| IV | −3.208 | | | |
| | | 2.77 | 1.85 | 32.2 |
| V | −6.300 | | | |
| | | 8.36 | Air | — |
| VI | 8.785 | | | |
| | | 8.785 | 1.62 | 36.4 |
| 1' | (plane) | | | | wherein 1 designates the plane end surface of a first rod lens, I designates the convex end surfaces of the first rod lens, II designates the outer surface of a first outer lens of the additional lens system, III designates the inner surface of the first outer lens of the additional lens system, IV designates the inner surface of a second outer lens of the additional lens system, V designated the outer surface of the second outer lens of the additional lens system, VI designates the convex surface of a second rod lens, and 1' designates the plane end surface of the second rod lens.

10. Image transmission system according to claim 8, characterized by the following data:

| Surface | Radius | Thickness | Refractive Index | Abbé Number |
|---|---|---|---|---|
| 1 | (plane) | | | |
| | | 7.286 | 1.52 | 64.1 |
| I | −7.286 | | | |
| | | 9.88 | Air | — |
| II | 11.800 | | | |
| | | 3.0 | 1.85 | 32.2 |
| III | 2.943 | | | |
| | | 5.886 | 1.81 | 40.6 |
| IV | −2.943 | | | |
| | | 3.0 | 1.85 | 32.2 |
| V | −11.800 | | | |
| | | 9.88 | Air | — |
| VI | 7.286 | | | |
| | | 7.286 | 1.52 | 64.1 |
| 1' | (plane) | | | | wherein 1 designates the plane end surface of a first rod lens, I designates the convex end surfaces of the first rod lens, II designates the outer surface of a first outer lens of the additional lens system, III designates the inner surface of the first outer lens of the additional lens system, IV designates the inner surface of a second outer lens of the additional lens system, V designated the outer surface of the second outer lens of the additional lens system, VI designates the convex surface of a second rod lens, and 1' designates the plane end surface of the second rod lens.

11. Image transmission system according to claim 7, characterized by the following data:

| Surface | Radius | Thickness | Refractive Index | Abbé Number |
|---|---|---|---|---|
| 1 | (plane) | | | |
| | | 4.664 | 1.52 | 64.1 |
| I | −4.664 | | | |
| | | 7.5 | Air | — |
| II | 5.158 | | | |
| | | 1.4 | 1.85 | 32.2 |
| III | 2.585 | | | |
| | | 1.44 | 1.62 | 53.1 |
| IV | −2.585 | | | |
| | | 1.4 | 1.85 | 32.2 |
| V | −5.158 | | | |
| | | 7.5 | Air | — |
| VI | 4.664 | | | |
| | | 4.664 | 1.52 | 64.1 |
| 1' | (plane) | | | | wherein 1 designates the plane end surface of a first rod lens, I designates the convex end surfaces of the first rod lens, II designates the outer surface of a first outer lens of the additional lens system, III designates the inner surface of the first outer lens of the additional lens system, IV designates the inner surface of a second outer lens of the additional lens system, V designated the outer surface of the second outer lens of the additional lens system, VI designates the convex surface of a second rod lens, and 1' designates the plane end surface of the second rod lens.

12. Image transmission system according to claim 7, characterized by the following data:

| Surface | Radius | Thickness | Refractive Index | Abbé Number |
|---|---|---|---|---|
| 1 | (plane) | | | |
| | | 4.664 | 1.52 | 64.1 |
| I | −4.664 | | | |
| | | 7.36 | Air | — |
| II | 6.467 | | | |
| | | 1.33 | 1.85 | 32.2 |
| III | 2.661 | | | |
| | | 2.16 | 1.72 | 47.9 |
| IV | −2.661 | | | |
| | | 1.33 | 1.85 | 32.2 |
| V | −6.467 | | | |
| | | 7.36 | Air | — |
| VI | 4.664 | | | |
| | | 4.664 | 1.52 | 64.1 |
| 1' | (plane) | | | | wherein 1 designates the plane end surface of a first rod lens, I designates the convex end surfaces of the first rod lens, II designates the outer surface of a first outer lens of the additional lens system, Ill designates the inner surface of the first outer lens of the additional lens system, IV designates the inner surface of a second outer lens of the additional lens system, V designated the outer surface of the second outer lens of the additional lens system, VI designates the convex surface of a second rod lens, and 1' designates the plane end surface of the second rod lens.

13. Image transmission system according to claim 7, characterized by the following data:

| Surface | Radius | Thickness | Refractive Index | Abbé Number |
|---|---|---|---|---|
| 1 | (plane) | | | |
| | | 5.309 | 1.62 | 36.4 |
| I | −5.309 | | | |
| | | 6.89 | Air | — |
| II | 6.923 | | | |
| | | 1.2 | 1.64 | 60.1 |
| III | −1.693 | | | |
| | | 2.4 | 1.66 | 50.9 |
| IV | 1.693 | | | |
| | | 1.2 | 1.64 | 50.1 |
| V | −6.923 | | | |
| | | 6.89 | Air | — |
| VI | 5.309 | | | |
| | | 5.309 | 1.62 | 36.4 |
| 1' | (plane) | | | | wherein 1 designates the plane end surface of a first rod lens, I designates the convex end surfaces of the first rod lens, II designates the outer surface of a first outer lens of the additional lens system, III designates the inner surface of the first outer lens of the additional lens system, IV designates the inner surface of a second outer lens of the additional lens system, V designated the outer surface of the second outer lens of the additional lens system, VI designates the convex surface of a second rod lens, and 1' designates the plane end surface of the second rod lens.

14. Image transmission system according to claim 7, characterized by the following data:

| Surface | Radius | Thickness | Refractive Index | Abbé Number |
|---|---|---|---|---|
| 1 | (plane) | | | |
| | | 5.085 | 1.62 | 36.4 |
| I | −5.085 | | | |
| | | 6.71 | Air | — |
| II | 6.043 | | | |
| | | 1.00 | 1.72 | 50.4 |
| III | −2.512 | | | |
| | | 2.4 | 1.81 | 40.6 |
| IV | 2.512 | | | |
| | | 1.00 | 1.72 | 50.4 |
| V | −6.043 | | | |
| | | 6.71 | Air | — |
| VI | 5.085 | | | |
| | | 5.085 | 1.62 | 36.4 |
| 1' | (plane) | | | | wherein 1 designates the plane end surface of a first rod lens, I designates the convex end surfaces of the first rod lens, II designates the outer surface of a first outer lens of the additional lens system, III designates the inner surface of the first outer lens of the additional lens system, IV designates the inner surface of a second outer lens of the additional lens system, V designated the outer surface of the second outer lens of the additional lens system, VI designates the convex surface of a second rod lens, and 1' designates the plane end surface of the second rod lens.

15. Image transmission system according to claim 1, characterized in that the additional lens system is designed as two pairs consisting in each case of two lenses cemented to one another.

16. Process for producing a rod lens for an image transmission system according to claim 1, characterized through the process steps:
  a) production of a glass sphere, the radius of which corresponds to the curvature radius of the convex end surface of the rod lens and
  b) production of a biconvex cylindrical glass rod from the glass sphere by removing a core through the midpoint of the glass sphere and
  c) bisecting of the biconvex cylindrical glass rod along its center plane.

17. Endoscope with at least one image transmission system according to claim 1.

18. Endoscope with at least two image transmission systems according to claim 1, characterized in that the rod lenses of two directly sequentially arranged image transmission systems, which rod lenses are formed as plano-convex lenses, are cemented together at their plane end surfaces.

19. Endoscope with at least two image transmission systems, each consisting of two rod lenses and at least one additional lens system, where in each case two directly sequentially arranged image transmission systems have a common inter-image surface, characterized in that in two sequentially arranged image transmission systems the adjoining rod lenses are formed as one-piece biconvex rod lenses, where the length of the one-piece biconvex rod lens is twice as large as the curvature radius of the two convex end surfaces and the inter-image surface lies symmetrically to the two convex end surfaces in the center plane of the biconvex rod lenses, and characterized in that at least one additional lens system is arranged symmetrically to the center plane between the two rod lenses of each image transmission system.

20. Endoscope according to claim 19, characterized in that the additional lens system consists of at least three lenses.

21. Endoscope according to claim 20, characterized in that the additional lens system is constructed symmetrically to the center plane, where the refractive power of the two external lenses of the additional lens system has the opposite sign to that of at least one central lens.

22. Endoscope according to claim 20, characterized in that $$n_m < n_a$$

and the external lenses of the additional lens system are formed as convex/concave meniscus lenses and the single (threesome 4) or two (dual units 8) middle lens(es) are formed as biconvex or plano-convex lens(es), where $n_m$ is the refractive index of the middle lens(es) and $n_a$ is the refractive index of the external lenses.

23. Image transmission system according to claim 20, characterized in that $$n_m > n_a$$

and the external lenses of the additional lens system are formed as biconvex or plano-convex lenses and the one (threesome 4) or two (dual units 8) middle lenses are formed as biconcave, plano-concave, plano-convex, or convex/concave lens(es), where $n_m$ is the refractive index of the middle lens(es) and $n_a$ is the refractive index of the external lenses.

24. Endoscope according to claim 19, characterized in that the additional lens system is made up of a threesome consisting of three lenses cemented together.

25. Image transmission system according to claim 24, characterized in that the middle lens of the additional lens system is formed as a biconvex lens, the length of which is twice as large as the curvature radius of its two end surfaces.

26. Endoscope according to claim 19, characterized in that the additional lens system is made up of two dual units each consisting of two lenses cemented together.

* * * * *

UNITED STATES PATENT AND TRADEMARK OFFICE
CERTIFICATE OF CORRECTION

| | |
|---|---|
| PATENT NO. | : 7,002,741 B2 |
| APPLICATION NO. | : 09/949608 |
| DATED | : February 21, 2006 |
| INVENTOR(S) | : Fang Lei |

It is certified that error appears in the above-identified patent and that said Letters Patent is hereby corrected as shown below:

On the Title Page, change assignee to read as shown:

ITEM (73) Assignee: Karl Storz GmbH & Co. KG (DE)

Signed and Sealed this

Twenty-second Day of August, 2006

JON W. DUDAS
*Director of the United States Patent and Trademark Office*